United States Patent [19]
Rutherford et al.

[11] Patent Number: 5,126,019
[45] Date of Patent: Jun. 30, 1992

[54] PURIFICATION OF CHLOR-ALKALI MEMBRANE CELL BRINE

[75] Inventors: John Rutherford, Punta Gorda, Fla.; Raymond W. Ver Hoeve, Houston, Tex.

[73] Assignee: Texas Brine Corporation, Houston, Tex.

[21] Appl. No.: 655,847

[22] Filed: Feb. 15, 1991

Related U.S. Application Data

[63] Continuation-in-part of Ser. No. 437,177, Nov. 16, 1989, Pat. No. 5,028,302.

[51] Int. Cl.$^5$ ............................................. C25B 1/16
[52] U.S. Cl. ..................................... 204/98; 204/128; 423/182; 423/463; 423/499; 423/551; 23/298; 23/302 R; 23/302 T
[58] Field of Search ................... 204/98, 128, 129; 423/182, 183, 499, 463, 641, 551; 23/302 R, 296, 297, 298, 302 T

[56] References Cited

FOREIGN PATENT DOCUMENTS 3216418  3/1982  Fed. Rep. of Germany ...... 204/128

OTHER PUBLICATIONS

EPO Search Report, Feb. 21, 1991, in EPO SN 901199321 and Abstract.
Research Disclosure, An. May 1988, #28925.
Crystallization of Sodium Sulfate from Brines Formed After DiSalination of Mine Water, Maksin et al., Khim Tekhnulvodx (1979 both Russian Language & English Translation.
Japanese Patent Publ. 56-32252, (1979), Tsurumi Soda Co. both Japanses Language & English Translation.

*Primary Examiner*—John Niebling
*Assistant Examiner*—Kathryn Gorgos
*Attorney, Agent, or Firm*—Peter F. Casella

[57] ABSTRACT

This invention relates to methods and systems for purifying brine for electrolysis in chlor-alkali cells, especially membrane cells by reducing the sulfate ion concentration, while at the same time minimizing the concentration of other undesireable ions such as calcium and chlorate. The methods and systems employed are unique combinations of refrigeration and crystalization, and brine recirculation techniques in the systems for electrolyzing brine.

14 Claims, 3 Drawing Sheets

PURIFICATION OF CHLOR-ALKALI MEMBRANE CELL BRINE

This is a continuation-in-part of Ser. No. 437,177 filed Nov. 16, 1989, now U.S. Pat. No. 5,028,302.

BACKGROUND OF THE INVENTION

Caustic soda and chlorine are produced concurrently with hydrogen by the electrolysis of an aqueous solution of sodium chloride in various types of electrolytic cells. Membrane cells using perfluorinated ion exchange membranes are the latest state of the art electrolytic cells utilized in the production of chlorine and caustic soda.

While membrane cells offer significant advantages over mercury cells and diaphragm cells, namely cell efficiency, power consumption, quality of products, and overall economics, these membrane cells require much purer brine than their predecessors. For example, calcium and magnesium content of the feed brine to the membrane cells must be reduced to the low ppb range.

Furthermore, the sulfate ion concentration has become very important in the feed brine to membrane cells, especially as the membranes are improved in composition to enhance their performance, because high concentrations of sulfate ions can cause premature failure of the membranes, both mechanically and in their separation performance. A typical feed brine sodium sulfate specification for membrane cells is below 7.0 gpl (4.73 gpl sulfate ion). Calcium sulfate impurity in many rock salts is greater than the 4.73 gpl sulfate ion specification. Further, only about 50% of the sodium chloride fed to the cells is converted, and the other 50% exits from the cells as depleted brine containing the sodium sulfate that was in the original cell brine feed.

The depleted brine cannot be thrown away because of economic and environmental considerations; hence, it must be resaturated, treated and returned to the cells. Since new calcium sulfate is dissolved in the resaturation process, the total sulfate ion concentration will keep increasing with each recycle step. The same is true if the cell plant is located near, or in pipe line communication with, the brine wells. Once the sodium sulfate content of the feed brine exceeds 7.0 gpl, the sulfate ions are considered to be detrimental to cell efficiency and membrane life. Thus, steps must be taken to eliminate or reduce the sulfate ions picked up in the process of dissolving salt or built up in the depleted brine sent to the resaturation process to make brine for electrolysis.

PRIOR ART

Various solutions to the problem of removal of sulfate ions from brine employed in chlor-alkali electrolysis have been proposed in the prior art or have actually been used in industry.

One solution to the problem is to supply purified evaporated salt to the cell plant. This may be supplied to the membrane cell plant by salt manufactures or the plant may choose to receive rock salt, brine or solar salt and install it's own evaporators to produce purified evaporated salt. In this case the sodium sulfate formed in the brine treatment step is removed from the multiple effect evaporators in the form of bitterns (brine containing 40-50 gpl sodium sulfate). The salt crystals formed in the evaporators are centifuged and washed to provide sodium chloride crystals containing as little as 400 ppm sodium sulfate.

The evaporation step may be eliminated by chemical treatment of the brine prior to conventional brine treatment. Conventional primary brine treatment systems include means for treating the brine with caustic soda (or cell liquor from the cathode compartment of the membrane cell) sodium carbonate or any other additives that may be necessary to eliminate impurities such as calcium, magnesium, iron, etc. The impurities are removed in a thickner and a filter. The additional chemical treatment may be accomplished with either barium chloride or barium carbonate or calcium chloride. Barium sulfate formed in the reaction is highly insoluble in sodium chloride brine and this would be the preferred route were it not for the high cost of barium salts and strict environmental limitations on disposal of barium sludges.

Calcium chloride is cheaper and does not cause the environmental problems that barium salts do. Unfortunately, calcium sulfate is a great deal more soluble than barium sulfate, and the brine leaving the chemical treatment step will increase in calcium sulfate concentration and require more treatment chemicals in the ensuing conventional brine treatment step, to reduce the sulfate content of the brine.

Usually, the additional calcium chloride treatment will result in a sodium sulfate content of less than 7.0 gpl after conventional brine treatment, but the process requires good balance between the sulfate content and the amount and cost of calcium chloride and sodium carbonate used to precipipate calcium sulfate and calcium carbonate. Because of these considerations, treatment to remove sulfate ions with calcium chloride can require considerable equipment, treatment chemicals and sludge handling and disposal.

Another method of removing sulfate ions from the finished brine that has been purified by employing various of the foregoing techniques is the use of anionic ion exchange resin beds that selectively remove the sulfate ion. This additional process step involves additional treatment chemicals, equipment and costs.

Various patents have been issued specific to the removal of sulfates from brine to be electrolyzed in chlor-alkali membrane cells.

U.S. Pat. No. 4,556,463 issued to Minz and Vajna on Dec. 3, 1985 shows the use of an anion exchange medium to remove the sulfate ion and then returning the solution to the cell. This patent refers to a book by J. S. Sconce entitled Chlorine which is part of the American Chemical Society Monograph Series for information on electrolysis and brine purification.

U.S. Pat. No. 4,565,612 issued to Fry on Jan. 21, 1986 discloses a process for reducing sulfate ion concentration in an aqueous solution comprising sodium hydroxide obtained by electrolysis of salt by adding sodium carbonate or bicarbonate and removing the insoluble salts. This patent discloses a prior art method of separating sodium sulfate from a hot caustic electrolytic cell effluent solution, having a concentration of about 20 to 35 percent by weight of sodium hydroxide, by directing it from an evaporator to a heat exchanger where it is cooled to about zero degrees Centigrade to precipitate out sodium sulfate decahydrate.

U.S. Pat. No. 4,586,993 issued to O'Brien on May 6, 1986 shows the use of calcium salt addition to form the precipipate of calcium sulfate followed by an ion exchange column to assist in the removal.

U.S. Pat. No. 4,747,917 issued to Reynolds, Breaux and Reed on May 31, 1988 discloses a process for removing sulfate ions from brine in a five step process which include adding salt to depleted brine, before treating it to remove the sulfate in the crystallizer. This patent mentions a prior art method of reducing sulfate ion concentration by forming Glauber's salt (sodium sulfate decahydrate) and requiring additional energy expenditures by going through heating and cooling cycles to remove it.

In addition to the foregoing prior art, an article published in the 1986 Chlorine Institute book entitled Modern Chlor-Alkali Technology, Volume 3, by T. F. O'Brien entitled Control of Sulfates in Membrane-Cell Brine Systems on pages 326-349 reviews the then current state of the art on sulfate removal from membrane cell brine.

In our copending application Ser. No. 437,177, of which this application is a continuation-in-part, German patent 3,216,418 issued to R. Shafer in 1983 was cited. This patent deals with the cooling and refrigeration of a side stream of depleted brine from mercury cells to temperatures of −5 to +10 degress Centigrade in order to reduce the sulfate ion content of the main stream brine to 10 to 30 gpl. This patent applies to mercury cell installations where a sulfate ion content of 10 gpl (14.8 gpl sodium sulfate) is tolerable.

In our copending application, we disclosed and claimed methods directed at the purification of brine intended for use in membrane cells, where the sodium sulfate content of the brine fed to the membrane cells is reduced to below 10 gpl, preferably 7 gpl or lower. The current specification for sulfate ion in the feed brine to membrane cells is below about 6.76 gpl and preferably below about 4.73 gpl. Said methods are especially useful where the brine source is heavily contaminated with sulfate impurities as shown in our copending application.

In membrane cell installations, where the source of salt is relatively low in sulfate ion content, for example 2-3 gpl calcium sulfate (1.41-2.12 gpl sulfate ion) and the known processes are employed for purifying the brine, and the depleted brine is returned to the brine wells; or other containers for resaturating the depleted brine, such as the dissolving tanks when employing rock salt, solar salt or recovered process salt, then, the constant recycling of the depleted brine to the wells (or other containers) results in the build-up of sulfate ions in the resaturated brine in just a few recycles, sometimes at a rate of about 2-3 gpl of calcium sulfate per cycle. This build-up of sulfates is such that it renders the resaturated brine unsuitable for electrolysis in membrane cells.

OBJECTS OF THE INVENTION

It is, therefore, an object of this invention to provide methods and systems for reducing the sulfate ion content of depleted brine from membrane cells, that is continuously or repeatedly recycled for resaturation of sodium chloride content, so that the sulfate ion content of the brine after repeated resaturation with sodium chloride in brine wells having low sulfate content of less than 2-3 gpl calcium sulfate, (or other containers such as resaturators when using relatively pure salt containing less than 2-3 gpl calcium sulfate), is maintained below about 6.76 gpl of sulfate ions (10 gpl expressed as sodium sulfate), and preferably below about 4.73 gpl sulfate ions (7 gpl expressed as sodium sulfate).

It is a further object of this invention to provide methods and systems for maintaining the low sulfate content found in relatively pure brines (which result from brining certain salt domes in various geographical locations or by virtue of using low sulfate content rock salt, solar salt or recovered process salt), and to prevent the contamination of such brines with increased levels of sulfate, which is picked up in the membrane cell electrolysis, due to the depleted brine being continuously recycled to those salt sources for resaturation of sodium chloride content and re-use in the membrane cells.

It is still a further object of this invention to provide methods and systems for maintaining the specification of low concentration of sulfate ions in brine issuing from wells that are mined from relatively pure salt beds which wells are continuously used for resaturation of depleted brine from membrane cell plant installations, which installations are in pipeline communication with the brine wells, and which transmit freshly mined brine mixed with the resaturated depleted brine in one line and return depleted brine for resaturation in an adjacent line.

BRIEF DESCRIPTION OF THE INVENTION

In the case of employing wells in dual pipeline communication for transmitting depleted brine resulting from the electrolysis process in membrane cells to the wells and for transmitting freshly mined brine mixed with resaturated depleted brine to the membrane cell plant installation, this invention employs the use of refrigeration and crystallization to reduce the sulfate content of the depleted brine exiting from the cells to a level whereby the additional sulfate picked up in the resaturation process in the wells, will not increase the total sulfate ion content of the reconstituted brine issuing from the wells to above 6.76 gpl sulfate ions, preferably 4.73 or lower. This invention is particularly useful in those cases where the brine wells are in close enough proximitiy to permit the use of dual pipelines to and from the membrane cell plant. It is applicable to those wells having a low enough calcium sulfate content such that after the sulfate ion content in the depleted brine has been reduced by refrigeration and separation of the products of crystalization, the pickup of sulfate ion in the resaturation process in the wells will not cause the sulfate content of the exit brine to exceed 6.76 gpl sulfate ions, preferably 4.73 or lower. This is of special value in domed salt wells geographically located in the Gulf States of the United States, such as in Louisiana and Texas where the solid salt is relatively pure. It may also apply to wells in layered salt such as found around the Great Lakes Salt Basin in New York State and Michigan, but in many cases, layered salt will contain too much calcium sulfate to produce a satisfactory membrane cell feed that has a sulfate content of below 6.76 gpl sulfate ions or less.

In the case where resaturators are employed with solid salt such as rock or solar salt, or recovered process salt, the refrigeration and crystallization of depleted brine to reduce sulfates to a level where the pickup of calcium sulfate in the resaturation process is limited by the purity of the solid salt (i.e. the low sulfate content) to maintain a sulfate ion content in the feed brine to the membrane cells at below 6.76 gpl sulfate ions, preferably 4.73 or lower. This invention applies to those solid salt sources pure enough to maintain the sulfate ion content of the membrane cell brine feed at below 6.76 gpl sulfate ions or less.

In order that this invention may be more readily understood, it will be described with respect to certain preferred embodiments, especially as contained in the attached drawings, and examples given herein; however, it is to be understood that these embodiments are not to be construed as limiting the invention except as defined in the appended claims.

BRIEF DESCRIPTION OF THE DRAWINGS

FIG. I is a flow sheet of a brine well, brine supply system in accordance with this invention for making and supplying high purity brine to a typical membrane cell plant installation.

FIG. II is a flow sheet of a solid salt, brine resaturator supply system in accordance with this invention for making and supplying high purity brine to a typical membrane cell plant installation.

Figure 1:
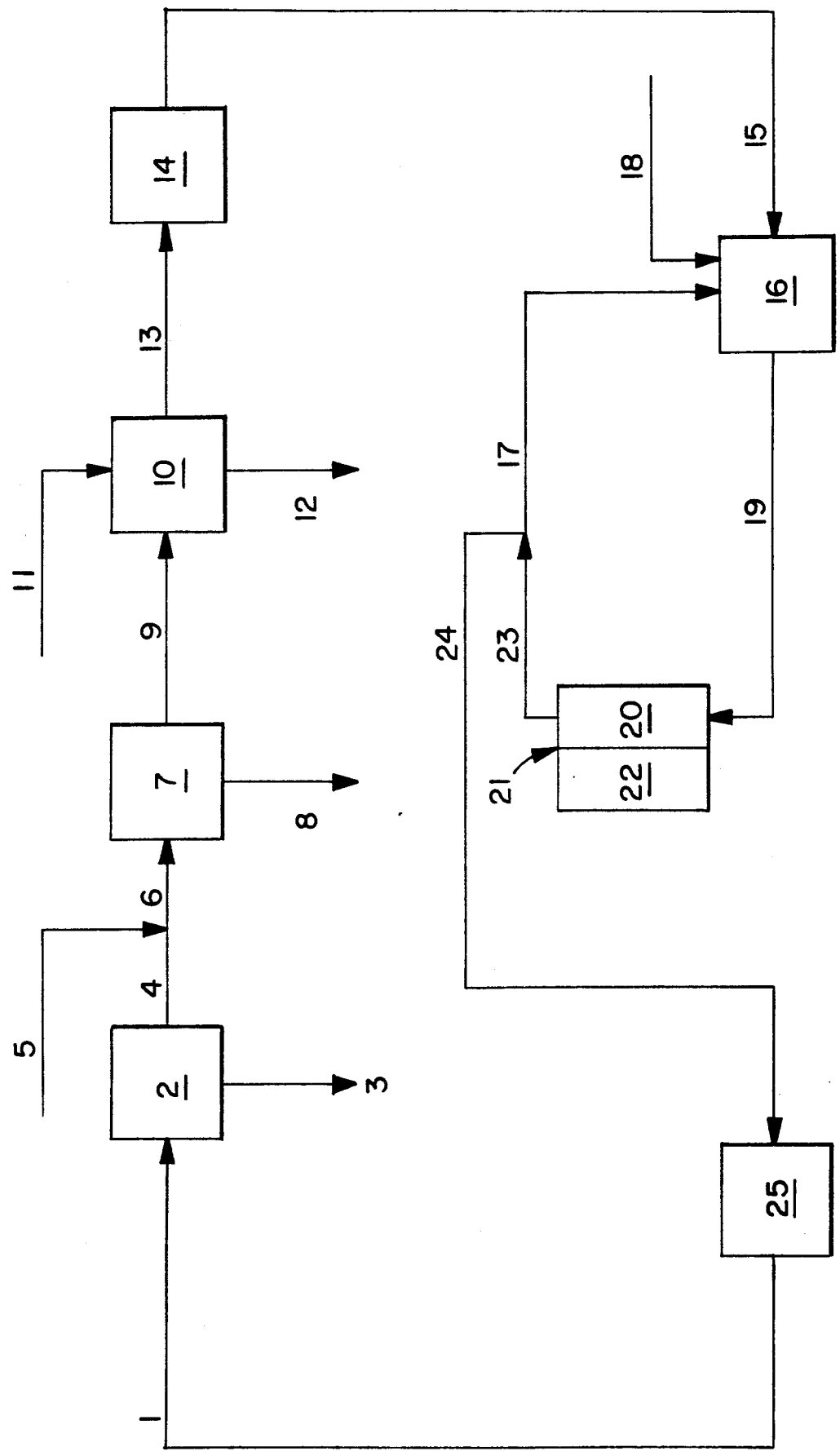
Figure 2:
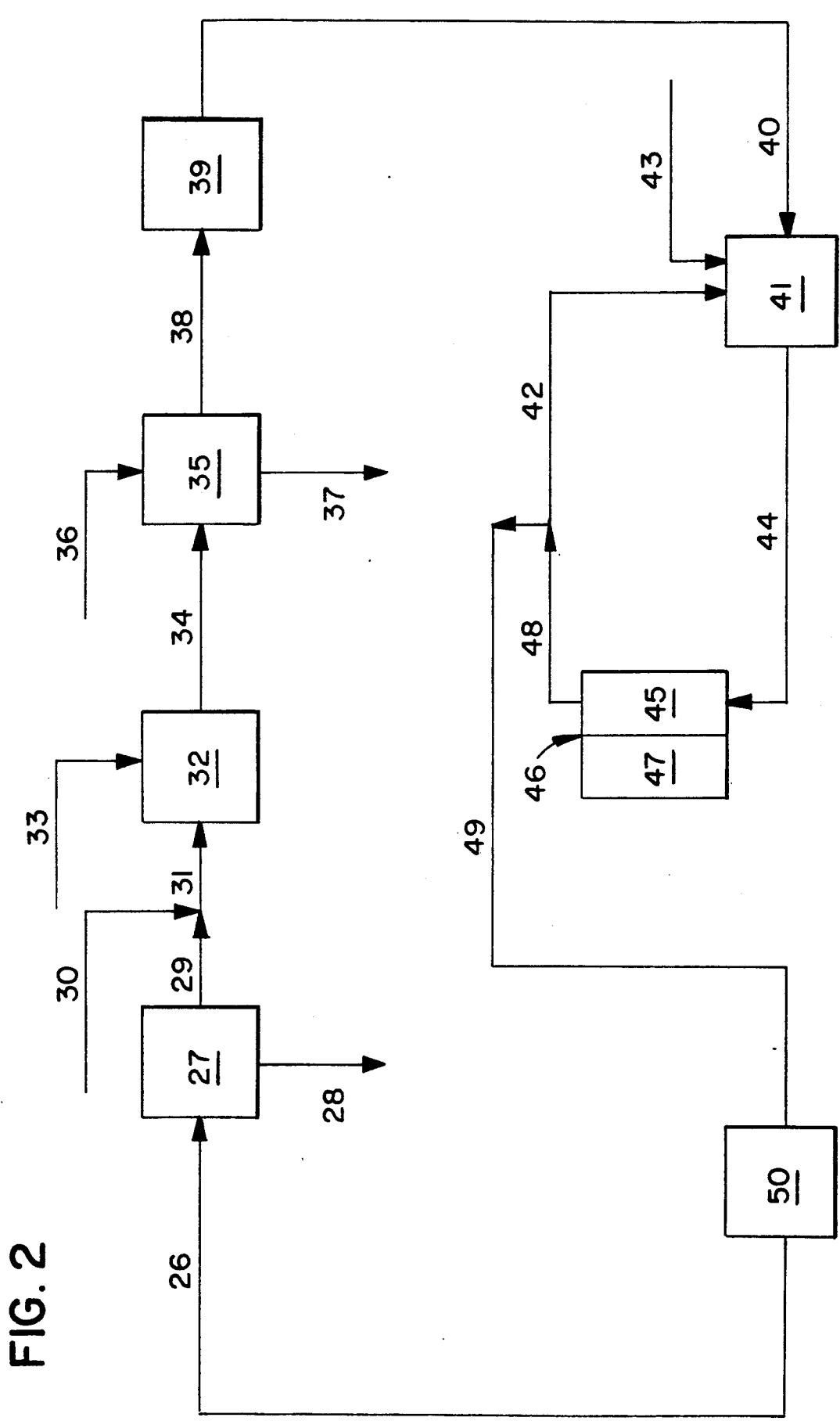
Figure 3:
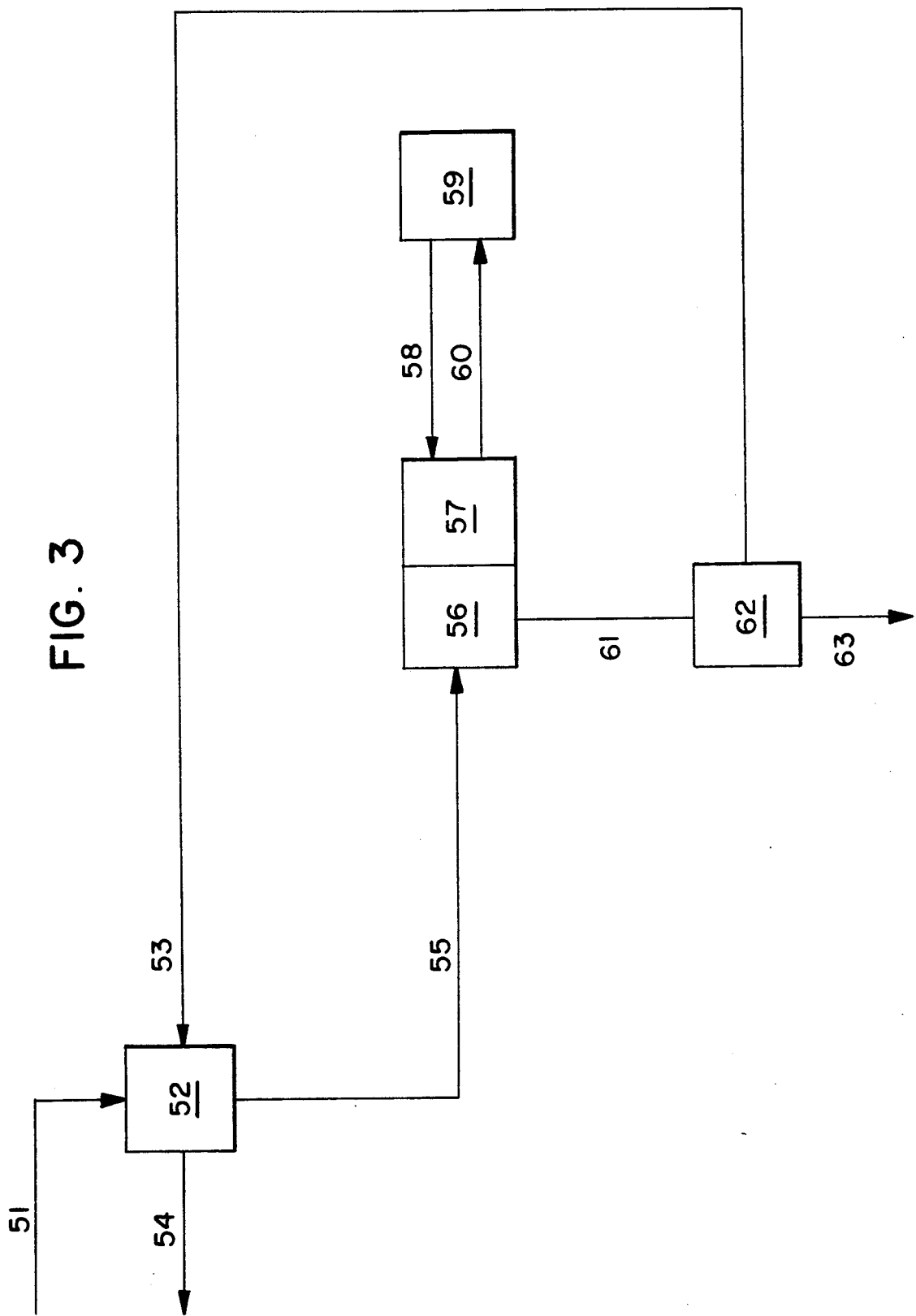

FIG. III is a flow sheet of the recuperative refrigeration and crystallization system of this invention used on the depleted brine being returned to the salt source for resaturation in sodium chloride content.

DETAILED DESCRIPTION OF THE INVENTION

We have found methods and systems for employing unique combinations of refrigeration and crystallization, and brine recirculation techniques in systems to make brine for electrolysis in membrane cell plant installations, which methods and systems reduce the sulfate content of depleted brine from membrane cells, that is continuously or repeatedly recycled for resaturation of sodium chloride content, so that the sulfate content of the brine after resaturation with sodium chloride in brine wells having low calcium sulfate content, or other containers such as resaturators when using relatively pure salt, is maintained below about 6.76 gpl sulfate ions, (10 gpl expressed as sodium sulfate) and preferably below about 4.73 gpl sulfate ions (7 gpl expressed as sodium sulfate).

We have also found methods and systems for maintaining the low sulfate content found in relatively pure brines (which result from brining certain salt domes in various geographical locations or by virtue of using low sulfate content rock salt, solar salt or recovered process salt), and to prevent the contamination of such brines with increased levels of sulfate, which is picked up in the membrane cell electrolysis, due to the depleted brine being recycled to those salt sources for resaturation of sodium chloride content and re-use in the membrane cells.

The depleted brine returned from membrane cells for resaturation in brine wells, or resaturation tanks supplied with solid salt, is generally in the range of 17% sodium chloride content and contains essentially all the sodium sulfate contained in the feed brine to the membrane cells. The first crystal point of ice from pure 17% brine is in the order of $-13$ degrees Centigrade. We have found that by refrigerating the depleted brine to a temperature close to or lower than this first crystal point of water ice the solubility of the sodium sulfate in the brine will be reduced to the 3.5 to 4.0 gpl range. Sodium sulfate above this range crystallizes out as sodium sulfate decahydrate (Glauber's salt). Crystallization and sparation of the Glauber's salt leaves a depleted brine low in sulfate content. In accordance with our invention, the temperature may be reduced to as low as $-15$ degrees Centigrade thereby making about an 18% sodium chloride content brine by freezing out some of the water and separating it out as ice.

Further, when the desulfated depleted brine is sent to brine wells containing low concentrations of calcium sulfate in the salt bed, or to resaturators supplied with solid salt containing low calcium sulfate concentrations, the resaturated brine issuing from the wells or resaturators will have a sulfate ion content low enough to be satisfactory for use in membrane cells. For example, if a brine well operating on the injection of water only to the well produces a brine containing 2.0 gpl of calcium sulfate and is switched to desulfated depleted brine produced in accordance with our invention, and the sodium sulfate content of the desulfated brine is of the order of 3.5 gpl, the raw brine issuing from the well will have a sulfate ion content of less than 3.8 gpl. This is so because water is added to the desulfated depleted brine to make up for the water consumed in the electrolysis process in the cells; and the water lost to the void space created in the well by the continuing solution mining of solid salt in the well; and a small portion of the sodium sulfate contained in the refrigerated depleted brine will be lost to the cavity, thereby yielding a sulfate ion content of less than the 3.8 gpl mentioned above.

At one membrane plant installation, using Nafion membranes, which are fluoropolymers containing pendant sulfonic acid groups such as supplied by E. I. duPont de Nemours & Company, a typical specification for the sulfate ion content of membrane cell feed brine is about 4.73 gpl (7 gpl expressed as sodium sulfate). As can be seen from the foregoing exemplification of the methods and systems of our invention, the need for the typical evaporation step or the addition of the usual calcium chloride treatment, and the additional equipment required by both of these additional step in the prior art purification processes, is eliminated by our invention.

Referring to the drawings which were briefly described above; specifically FIG. I: 1, represents the dechlorinated depleted brine flowing to the refrigeration and crystallization system, 2, where the approximately 17% brine is cooled and refrigerated to about $-13$ degrees Centigrade or lower and sodium sulfate is crystallized and removed as sodium sulfate decahydrate, 3. The purified depleted brine, 4, is mixed with makeup water, 5, and flows, 6, to the brine well, 7. A portion of the sodium sulfate and the makeup water are lost, 8, to the void space created by the dissolving of salt in the well. Reconstituted brine, 9, i.e. brine that is resaturated in its sodium chloride content, exiting from the well contains roughly 26% sodium chloride and total sulfates of less than about 4.73 gpl sulfate ion. The reconstituted brine, 9, flows by pipeline to a conventional brine treatment system, 10, where sodium hydroxide, sodium carbonate and other chemicals, 11, are added to precipitate metals such as calcium, magnesium, iron and other impurities. Solids precipitated are removed, 12, and handled in a conventional manner. The brine so treated, 13, then flows to a typical secondary brine treatment system, 14, where it is further purified to reduce metal impurities to the satisfactory level established for operating membrane cells. Purified brine, 15, then flows to a typical membrane anolyte system, 16, where it is mixed with recirculating anolyte brine, 17, acidified, 18, and fed, 19, to the membrane cell anolyte compartment, 20. The anolyte compartment is separated by membranes, 21, from the catholyte compartment, 22. Chlorine is produced in the anolyte compartment and hydrogen and sodium hydroxide are produced in the catholyte compartment. For the sake of simplicity, these products are not shown on this flow sheet. The exiting anolyte brine 23, less the recirculation stream, 17, flows, 24, to the dechlorinator, 25. Dechlorinated brine, 1, is then returned to the system. This processing, which is in accordance with our invention, eliminates both the salt evaporation or the calcium chloride treatment steps.

FIG. II illustrates a similar system operating with a brine resaturation tank and solid salt. Dechlorinated depleted brine, 26, containing approximately 17% sodium chloride is sent to the refrigeration and crystallization system, 27, where it is cooled and refrigerated to or below the first crystal point of ice in pure 17% brine solution (about −13 degrees Centigrade), or lower. Sodium sulfate decahydrate and ice are settled or filtered out, 28, and the desulfated brine, 29, is diluted with makeup water, 30, to replace the water consumed in the electrolysis process in the membrane cells. The diluted brine, 31, is fed to a brine resaturator, 32, where solid salt, 33, is added to reconstitute the brine to roughly 26% sodium chloride. The reconstituted brine, 34, is then sent to a conventional brine treatment system, 35, where sodium hydroxide, sodium carbonate and other chemicals, 36, are added to precipitate calcium, magnesium, iron and other impurities. The solids are separated, 37, and purified brine, 38, flows to a typical secondary brine treatment system, 39, where the brine is further purified and then sent, 40, to a typical membrane cell anolyte system, 41, where it is mixed with recirculating anolyte brine, 42, acidified, 43, and fed, 44, to the membrane cell anolyte compartment, 45. The anolyte compartment is separated by membranes, 46, from the catholyte compartment, 47. Chlorine is produced in the anolyte compartment and hydrogen and sodium hydroxide are produced in the catholyte compartment. For the sake of simplicity, these products are not shown on this flow sheet. Depleted brine, 48, less the recirculated brine, 42, is sent, 49, to a typical dechlorinator, 50, where it is dechlorinated before recycle, 26, to the refrigeration and crystallization system.

Although the foregoing descriptions with respect to FIGS. I and II show the introduction of makeup water after the crystallization step and refrigeration is carried out to temperatures approaching the freezing point of pure dilute brine, the makeup water may be added before the crystallization step and refrigeration may be carried out to below the freezing point of pure dilute sodium chloride brine.

FIG. III illustrates a mode of refrigeration and crystallization for use in this invention utilizing a heat recuperator and conventional high magma density refrigerator crystallizer. Dechlorinated depleted brine, 51, flows through a heat recuperator, 52, where it is precooled by the cold, desulfated brine, 53, heating the desulfated brine, 54, and the precooled brine, 55, flows to a typical crystallizer, 56. The crystallizer may consist of a circulation tank equipped with a circulating pump and a shell and tube heat exchanger, 57, all designed to promote the crystall growth of Glauber's salt. The circulating brine in the crystallizer is refrigerated to about −13 degrees Centigrade using conventional refrigeration, 58, 59, 60. The refrigerated brine, 61, exits to a separator, 62, where Glauber's salt crystalls are removed, 63. The cold desulfated brine, 53, then flows to the recuperator, 52.

In the foregoing description with respect to FIG. III, for the purpose of simplification, we have not shown or described any equipment to recover refrigeration values from melting the Glauber's salt, nor the various types of crystallizers and refrigeration mediums that may be used in our invention.

Various modifications within the spirit and scope of our invention may be made, some are referred to above, and although we have given detailed descriptions of our invention, illustrating specific embodiments, we do not intend to be limited thereto, except as defined by the following claims.

We claim:

1. A method for controlling the sulfate ion concentration in brine made from a salt source comprising sodium, chloride, calcium and less than 6.76 gpl sulfate ion content, for use in electrolysis in a chlor-alkali membrane cell plant installation, which salt source is continuously used to resaturate recycled depleted brine exiting from membrane cells, with chloride ions, which comprises subjecting substantially all of the depleted brine exiting from the membrane cells to refrigeration temperatures of close to or lower than the first crystal point of ice formation and crystallization to precipitate and separate out Glauber's salt, before returning the depleted brine to the salt source, thereby reducing sulfate ion content so that calcium sulfate dissolved from the salt source and the sulfate ions in the treated depleted brine, will be less than 6.76 gpl sulfate ions in the resaturated brine exiting from the salt source, for recycle to the membrane plant installation for electrolysis.

2. A method in accordance with claim 1, wherein the salt source is rock salt, solar salt, recovered process salt or brine well salt.

3. A method in accordance with claim 1, wherein the brine produced from the salt source contains about 2-3 gpl of calcium sulfate or less.

4. A method in accordance with claim 1, wherein the sulfate ions dissolved as calcium sulfate from the salt source and the sulfate ions in the treated depleted brine, will be less than 4.73 gpl sulfate ions in the resaturated brine exiting from the salt source, for recycle to the membrane plant installation for electrolysis.

5. A method in accordance with claim 1, wherein the salt source is a brine well and the sulfate ions dissolved as calcium sulfate from the salt source and the sulfate ions in the treated depleted brine, will be less than 4.73 gpl sulfate ions in the resaturated brine exiting from the salt source, for recycle to the membrane plant installation for electrolysis.

6. A method in accordance with claim 1, wherein the membrane cell plant installation is in pipeline communication with a brine well installation and wherein the resaturated brine is sent to the cell installation in one pipeline and the depleted brine from the cells is returned to the well installation for resaturation with salt in another pipeline.

7. A method in accordance with claim 1, wherein the membrane cell plant installation is used in conjunction with a brine resaturation installation comprising dissolving tanks for rock salt, solar salt or recovered process salt and wherein the resaturated brine is sent to the membrane cell installation and the depleted brine from the membrane cell installation is subjected to refrigeration and crystallization to precipitate and separate out Glaubers salt, before returning the depleted brine to the resaturation installation.

8. A method in accordance with claim 1, wherein the brine produced from the salt source contains less than 2-3 gpl calcium sulfate and the sulfate ions will be less than 4.73 gpl in the resaturated brine exiting from the salt source, for recycle to the membrane cell plant installation.

9. A method for controlling the sodium sulfate content of feed brine to membrane cells at 10 gpl, or lower, when used in conjunction with brine wells having a low calcium sulfate salt source and a dual pipeline system between the wells and membrane cell plant installation which comprises refrigeration temperatures close to or lower than the first crystal point of ice formation and crystallization, and removal of Glauber's salt from substantially all the depleted brine exiting from the cells before the brine is returned to the brine wells, so that the sodium sulfate content of the depleted brine is low enough, and so that the calcium sulfate dissolved in the wells will not cause the total sulfate ion content of the resaturated brine exiting the wells to be greater than 6.76 gpl, or lower.

10. A method in accordance with claim 9, wherein the sodium sulfate content of the feed brine to the membrane cells is preferably below about 7 gpl.

11. A method in accordance with claim 10, wherein the sodium sulfate content of the feed brine to the membrane cells is preferably below about 7 gpl.

12. A method for controlling sodium sulfate content of feed brine to membrane cells at 10 gpl, or lower, when used in conjunction with brine resaturators and a solid salt source having a low calcium sulfate content which comprises refrigeration temperatures of close to or lower than the first crystal print of ice formation and crystallization, and removal of Glauber's salt from substantially all depleted brine exiting from the cells before the brine is returned to the resaturators, so that the sodium sulfate content of the depleted brine is low enough, and so that the calcium sulfate dissolved in the resaturators will not cause the total sulfate ion content of the resaturated brine exiting the resaturator to be greater than 6.76 gpl, or lower.

13. A method in accordance with claim 9, wherein the total sulfate ion content of the resaturated brine exiting the resaturators is preferably below about 4.73 gpl.

14. A method in accordance with claim 10, wherein the total sulfate ion content of the resaturated brine exiting the resaturators is preferably below about 4.73 gpl.

* * * * *

UNITED STATES PATENT AND TRADEMARK OFFICE
CERTIFICATE OF CORRECTION

PATENT NO. : 5,126,019
DATED : 06/30/92
INVENTOR(S) : John Rutherford, et al.

It is certified that error appears in the above-indentified patent and that said Letters Patent is hereby corrected as shown below:

On the Title page, after item [22], please add --item [*] Notice: The portion of the term of this patent subsequent to 07/02/08 has been disclaimed--.

Signed and Sealed this

Twenty-sixth Day of October, 1993

Attest:

BRUCE LEHMAN

Attesting Officer

Commissioner of Patents and Trademarks